3,455,786
PROCESS FOR THE PRODUCTION OF POLYSACCHARIDE GUM POLYMERS
Guido M. Miescher, Terre Haute, Ind., assignor to Commercial Solvents Corporation, New York, N.Y., a corporation of Maryland
No Drawing. Filed Nov. 10, 1965, Ser. No. 507,236
Int. Cl. C12d 13/04; C08b 19/04
U.S. Cl. 195—31                                              2 Claims

ABSTRACT OF THE DISCLOSURE

A process for preparing polysaccharide B–1459 which consists of cultivating the organism *Xanthomonas campestris* NRRL B–1459 in an aqueous nutrient medium containing dry-milled corn starch. Polysaccharide B–1459 is useful as a film-former in edible wrappings.

---

This invention relates to an improved process for the production of polysaccharide gum polymers. In a particular aspect this invention relates to an improved process for the production of polysaccharide gum polymers by fermentation with the organism *Xanthomonas campestris* NRRL B–1459 in an aqueous fermentation medium containing starch derived from the dry milling of corn.

S. P. Rogovin, R. F. Anderson and M. C. Cadmus (Journal of Biochemical and Biological Technology and Engineering, vol. 3, No. 1) have reported that the organism *Xanthomonas campestris* NRRL B–1459 produces a polysaccharide gum polymer in an aqueous fermentation medium. The polysaccharide gum polymer, which is commonly referred to as polysaccharide B–1459, is an exocellular, heteropolysaccharide gum polymer which hydrates and swells rapidly on dispersion in water and then forms a viscous material. In contrast to most polysaccharide gum polymers, polysaccharide B–1459 retains its viscosity on heating and in the presence of salts. Polysaccharide B–1459 has found use as a film-former in edible wrappings and as a dispersing and thickening agent in paints and foods.

In accordance with the teachings of the authors of the aforementioned publication, polysaccharide B–1459 is obtained by fermentation in an aqueous medium utilizing glucose as a source of carbohydrate, distillers solubles or yeast as a source of nitrogen and small amounts of appropriate mineral salts. The yield of the polysaccharide is determined by measurement of the viscosity of the fermentation medium at the end of the fermentation period. Increased viscosities indicate increased yields.

It is an object of the present invention to provide an improved process for the production of polysaccharide B–1459 by fermentation in an aqueous medium with the organism *Xanthomonas campestris* NRRL B–1459.

It is a further object of the present invention to provide an improved nutrient fermentation medium for the production of polysaccharide B–1459.

Other objects and advantages of the present invention will be apparent from the specification and the claims.

The present invention resides in the discovery that the yields of polysaccharide B–1459 are increased by fermentation with the organism *Xanthomonas campestris* NRRL B–1459 in an aqueous fermentation medium containing starch derived from the dry milling of corn which is known as dry-milled cornstarch. The medium of the present invention is advantageous in that one nutrient material, namely dry-milled cornstarch, serves as the source of carbohydrate and the source of nitrogen. In contrast prior art media as typified by those described in the above mentioned publication have utilized separate sources of carbohydrate and nitrogen.

Generally the process of the present invention consists of fermenting the organism *Xanthomonas campestris* NRRL B–1459 in an aqueous medium containing dry-milled cornstarch as the nutrient material. Suitably the medium contains from about 2 to 8% by weight based on the weight of the medium of dry-milled cornstarch. The fermentation is typically conducted for a period of about 3 to 5 days under conditions of aeration and agitation at a pH in the range of from about 6.6 to about 7.5 and at a temperature in the range of from about 25 to about 35° C. The medium is preferably maintained at a pH in the range of from about 7.0 to about 7.2 and at a temperature in the range of from about 28 to about 32° C. The medium also may contain small amounts of mineral salts such as magnesium sulfate, iron sulfate and potassium acid phosphate.

In carrying out the process of the present invention it is often desirable to add an antifoaming agent to the fermentation medium to control excessive foaming. Examples of suitable antifoaming agents include 4-methyl-4-hydroxy-methyl-2-heptadecenyl-2-oxazoline, lard oil and mineral oil.

The dry milling process used to obtain the dry-milled cornstarch of the present invention is well known to the art. The process serves to separate the hulls, germ and substantially all of the gluten from the cornstarch. A typical dry-milled cornstarch product is sold under the trade name Hi-Starch by Illinois Cereal Mills, Inc. of Paris, Ill. Such a product contains from about 70–80% carbohydrate, and from about 5–10% protein.

The term "dry-milled cornstarch" as used herein is taken to include the starch material as obtained by the dry milling of corn in which the starch granules are intact and dry-milled cornstarch which has been thinned to reduce the molecular weight of the starch carbohydrate material. Typically, starch is thinned by treatment with acid or with starch thinning enzymes. Such procedures are well known to the art and are described in detail in Kerr, Chemistry and Industry of Starch, Academic Press (1950).

After preparation of polysaccharide B–1459 by fermentation with the organism *Xanthomonas campestris* NRRL B–1459, according to the above described procedure, the polysaccharide B–1459 can be recovered by any suitable means. One such means of recovery involves adjusting the pH of the fermentation medium downward to in the ranges of 5–6, as with a mineral acid, adding about 1 part by weight of methanol to the medium for each 5 parts by weight of medium, removing the cells from the medium by centrifugation, and adding an electrolyte, such as potassium chloride, and methanol to the medium in amounts sufficient to precipitate the polysaccharide polymer material. The precipitated polysaccharide polymer may be further purified by dissolving it in water and reprecipitating it from its aqueous solution with potassium chloride and methanol.

The invention will be understood more fully by reference to the following specific examples. It is understood that the examples are presented for purposes of illustration only and are not intended as a limitation of the invention.

EXAMPLE 1

*Xanthomonas campestris* NRRL B–1459 was cultivated for 24 hours at 30° C. on a rotary shaker at 300 r.p.m. in a sterilized aqueous inoculum seed culture medium of the following composition:

|  | Percent by weight |
|---|---|
| Glucose | 1.0 |
| Peptone | 0.5 |
| Malt extract | 0.3 |
| Yeast extract | 0.3 |

An aqueous nutrient medium having the following composition was prepared.

| | Percent by weight |
|---|---|
| Dry-milled cornstarch | 4.2 |
| $K_2HPO_4$ | .25 |
| $MgSO_2 \cdot 7H_2O$ | .1 |

100 milliliters of the aqueous nutrient medium were charged to a 500 milliliter shake flask. The pH of the medium was then adjusted upward to 7.2 with aqueous sodium hydroxide and the medium was sterilized. The medium was then aseptically inoculated with 5 milliliters of the inoculum seed culture and the medium was incubated at 30° C. on a rotary shaker at 320 r.p.m. for 96 hours. During the incubation period the pH of the medium was maintained at about 7.2 by the periodical addition of aqueous sodium hydroxide.

At the end of the 96-hour incubation period the medium was found to contain polysaccharide B-1459. The viscosity of the medium at the end of the 96-hour incubation period was found to be 15,800 centipoises. The viscosity was measured at 25° C. with a model LVT Brookfield viscometer using a No. 4 spindle at 30 r.p.m. The Brookfield viscometer is manufactured by Brookfield Engineering Laboratories of Staughton, Mass.

For comparative purposes the above procedure was repeated in all essential details with the exception that an aqueous nutrient medium having the following composition was employed.

| | Percent by weight |
|---|---|
| Glucose | 3.7 |
| Yeast extract | .5 |
| $K_2HPO_4$ | .25 |
| $MgSO_4 \cdot H_2O$ | .1 |

At the end of the 96-hour fermentation period the viscosity of the fermentation medium was measured as described above and found to be 11,000 centipoises.

The viscosity of the fermentation medium is a measure of the amount of polysaccharide formed; higher viscosities being obtained with greater amounts of polysaccharide in the fermentation medium.

A comparison of the viscosities of the above fermentations point up the effectiveness of dry-milled cornstarch in obtaining polysaccharide B-1459 in increased yield.

EXAMPLE 2

A sterilized aqueous nutrient medium having the following composition was prepared:

| | Percent by weight |
|---|---|
| Dry-milled cornstarch (unthinned) | 4.7 |
| $K_2HPO_4$ | .3 |
| $MgSO_4 \cdot 7H_2O$ | .15 |

The pH of the medium was adjusted upward to 7.2 with aqueous sodium hydroxide.

500 milliliters of this medium were charged to a 500-milliliter shake flask. The medium was then aseptically inoculated with a growing culture of *Xanthomonas campestris* NRRL B-1459.

The fermentation was carried out with agitation at approximately 30° C. During the fermentation the pH of the medium was maintained at approximately 7.2 by the addition of aqueous sodium hydroxide. At the end of the 96-hour fermentation period the medium was found to contain polysaccharide B-1459. The viscosity of the medium at the end of the 96-hour fermentation period was found to be 15,000 centipoises.

EXAMPLE 3

The procedure of Example 2 was repeated in all essential details with the exception that the following medium was utilized.

| | Percent by weight |
|---|---|
| Dry-milled cornstarch (unthinned) | 5.2 |
| $K_2HPO_4$ | .35 |
| $MgSO_4 \cdot 7H_2O$ | .2 |

At the end of the 96-hour fermentation period the viscosity of the fermentation medium was found to be 16,700 centipoises.

EXAMPLE 4

The procedure of Example 2 was repeated in all essential details with the exception that the following medium was utilized.

| | Percent by weight |
|---|---|
| Dry-milled cornstarch (unthinned) | 6.2 |
| $K_2HPO_4$ | .45 |
| $MgSO_4 \cdot 7H_2O$ | .3 |

At the end of the 96-hour fermentation period the viscosity of the fermentation medium was found to be 14,700 centipoises.

EXAMPLE 5

This example shows the production of polysaccharide B-1459 in a 5-gallon fermentor using dry-milled cornstarch which has been thinned by the action of a starch thinning enzyme.

1.5 grams of Miles H.T.-1000, a starch thinning enzyme preparation containing the enzyme alpha amylase and manufactured by Miles Laboratories, Inc. of Elkhart, Ind., were added to an aqueous fermentation medium having the following composition:

| | Percent by weight |
|---|---|
| Dry-milled cornstarch | 6.5 |
| $K_2HPO_4$ | .24 |
| $MgSO_4 \cdot 7H_2O$ | .06 |
| Lard oil ml | 6 |
| Water to 12,000 ml. | |

The medium was heated at 70° C. for 1 hour at atmospheric pressure in an autoclave. The autoclave was pressurized and the medium was heated for an additional 45 minutes at 120° C. in order to thin the starch.

The medium was then charged to a 5-gallon fermentor and inoculated with 200 mls. of a growing culture of *Xanthomonas campestris* NRRL B-1459. The fermentation was conducted at 30° C. for 90 hours with agitation and aeration. During the fermentation period the pH of the medium was maintained at about 7.1 with aqueous sodium hydroxide.

At the end of the 90 hour fermentation period the medium was found to contain polysaccharide B-1459. The viscosity of the medium at the end of the 90 hour fermentation period was found to be 12,100 centipoises.

Since many embodiments of this invention may be made and since many changes may be made in the embodiments described the foregoing is to be interpereted as illustrative only and the invention is defined by the claims appended thereto.

I claim:

1. An improved process for the production of polysaccharide B-1459 by fermentation with the organism *Xanthomonas campestris* NRRL B-1459 in an aqueous nutrient medium, the improvement that comprises carrying out the fermentation in an aqueous nutrient medium containing dry-milled cornstarch.

2. The process of claim 1 wherein the dry-milled cornstarch is thinned dry-milled cornstarch.

References Cited

UNITED STATES PATENTS 3,020,206 2/1962 Patton et al.
3,271,267 9/1966 Weber et al.

ALVIN E. TANENHOLTZ, Primary Examiner

U.S. Cl. X.R.

195—107; 260—209